US006516850B1

(12) United States Patent
Blohowiak et al.

(10) Patent No.: US 6,516,850 B1
(45) Date of Patent: Feb. 11, 2003

(54) APPARATUS FOR APPLYING RECLOSABLE FASTENERS TO A WEB OF FILM

(75) Inventors: Gerry J. Blohowiak, Green Bay, WI (US); Peter J. Hatchell, New Franken, WI (US); Sean Kevin Lemerand, Seymour, WI (US); Ernest H. Teske, Green Bay, WI (US); Scott C. Romenesko, Green Bay, WI (US)

(73) Assignee: Hudson-Sharp Machine Co., Green Bay, WI (US)

( * ) Notice: Subject to any disclaimer, the term of this patent is extended or adjusted under 35 U.S.C. 154(b) by 0 days.

(21) Appl. No.: 09/412,294

(22) Filed: Oct. 5, 1999

Related U.S. Application Data

(62) Division of application No. 08/896,179, filed on Jul. 17, 1997, now Pat. No. 6,003,582.

(51) Int. Cl.[7] .......................... B32B 31/00; B31B 1/90

(52) U.S. Cl. ...................... 156/352; 156/519; 156/515; 156/552; 156/251; 156/302; 156/196; 156/265; 156/252; 156/567; 493/214; 493/215; 493/927; 493/343; 493/372; 493/383; 493/393; 493/394; 383/63

(58) Field of Search ......................... 156/352, 64, 265, 156/302, 567, 378, 519; 383/63; 493/214, 215, 927, 343, 372, 383, 393, 394

(56) References Cited

U.S. PATENT DOCUMENTS 3,554,822 A 1/1971 Schwarzkopf ............... 156/66
3,650,873 A 3/1972 Smith et al. ................ 156/465

(List continued on next page.)

FOREIGN PATENT DOCUMENTS

| | | |
|---|---|---|
| DE | 32 41 362 | 11/1982 |
| JP | 60-137754 | 12/1983 |
| JP | 6-135609 | 10/1992 |

OTHER PUBLICATIONS

"Prior Art Dancer," admitted prior art (no date available).

*Primary Examiner*—Linda Gray
(74) *Attorney, Agent, or Firm*—Wood, Phillips, Katz, Clark & Mortimer

(57) ABSTRACT

An apparatus for applying strip fastener elements or zippers to web material includes an unwind stand holding a roll of film material, an infeed dancer arrangement of rollers, a zipper apparatus which conditions zipper material, cuts zippers and delivers zippers to a zipper feed apparatus. The zipper feed apparatus loads zippers into a sealing platen of a rotating turret. The rotating turret carries the zippers successively to a position adjacent a surface of the film and a seal bar presses the film to successive zippers to seal the zippers thereto while a new zipper is being received in a sealing platen of the turret at a loading station at a rotational position at a distance from the sealing station. The film with zippers attached is drawn downstream of the turret to a rewind dancer roll assembly and thereafter to a rewind stand for winding into a roll of zippered film.

8 Claims, 12 Drawing Sheets

U.S. PATENT DOCUMENTS 3,717,244 A 2/1973 Smith ......................... 206/484
3,948,705 A 4/1976 Ausnit ....................... 156/73.4
4,124,429 A * 11/1978 Crankshaw ................. 156/364
4,355,494 A 10/1982 Tilman ........................ 53/416
4,430,070 A 2/1984 Ausnit ........................ 493/215
4,449,962 A 5/1984 Copia ......................... 493/209
4,517,788 A 5/1985 Scheffers ..................... 53/459
4,555,282 A 11/1985 Yano ........................... 156/66
4,582,549 A 4/1986 Ferrell ......................... 156/66
4,617,683 A 10/1986 Christoff ...................... 383/63
4,655,862 A 4/1987 Christoff ...................... 156/66
4,666,536 A 5/1987 Van Erden et al. ........... 156/64
4,673,383 A 6/1987 Bentsen ...................... 493/381
4,691,373 A 9/1987 Ausnit ......................... 383/63
4,702,731 A 10/1987 Lambrecht et al. ......... 493/196
4,709,398 A * 11/1987 Ausnit ......................... 383/63
4,798,576 A 1/1989 DeBin ........................ 493/196
4,909,017 A 3/1990 McMahon et al. ............ 53/410
4,993,844 A 2/1991 Robinson et al. ............. 383/38
5,024,537 A 6/1991 Tilman ........................ 383/63
5,036,643 A 8/1991 Bodolay .................... 53/128.1
5,135,460 A 8/1992 Feustel .......................... 493/1
5,157,811 A 10/1992 Bodolay .................. 24/30.5 R
5,230,688 A 7/1993 Hatchell et al. ............ 493/193
5,276,950 A 1/1994 Johnson ....................... 24/587
5,383,989 A 1/1995 McMahon .................. 156/66
5,461,845 A 10/1995 Yeager ........................ 53/451
5,688,361 A * 11/1997 Itoh ........................... 156/362
5,776,045 A 7/1998 Bodolay ..................... 493/215

* cited by examiner

APPARATUS FOR APPLYING RECLOSABLE FASTENERS TO A WEB OF FILM

This is a division of application Ser. No. 08/896,179, filed Jul. 17, 1997, now U.S. Pat. No. 6,003,582.

FIELD OF THE INVENTION

The present invention relates to an apparatus which applies interlocking profile strips or "zippers" to a web. Particularly, the invention relates to an apparatus which applies plastic extruded interlocking profile zippers bonded transversely at regular intervals to a length of plastic film.

BACKGROUND OF THE INVENTION

U.S. Pat. No. 4,655,862 describes a method of making reclosable bags and material for making bags, including an apparatus wherein extruded fastener strips for reclosable bags are located across the longitudinal formation axis of the bag wall web material.

FIG. 13 of this reference illustrates a fastener strip applicator which uses a rotary drum adapted to be rotatably driven in step-by-step coordination with a form, fill, and seal apparatus. For preforming a large endless sheet quantity of the bag making web including fastener strip sections attached for future use, the applicator drum is rotated continuously for applying the strip sections to the continuously traveling web at bag length intervals. The drum is provided with axially extending pockets for receiving fasteners. A loader loads the proper length fastener strip section into one of the pockets, with the profiles extending inwardly toward the root of the channel-like pocket. A vacuum source may be applied to the pocket being loaded to hold the fastener therein. The loaded pocket then moves with rotation of the drum to a heating station where a heating roll heats the exposed base of the fastener strip. From the heating station, the strip is moved by rotation of the drum for application to the web. A heated rotatably driven roll may be provided to underlie the web across from the drum. The preheated fastener strip is brought into position for bonding to the web. At this point in the process, a positive pneumatic pressure is applied to the strip carrying pocket to apply a bonding pressure to the strip backed up by the roll. The bonded fastener then exits the pocket. The pocket advances toward the loading station to be reloaded with another fastener.

It would be desirable to provide a continuous, automated apparatus for preparing zippers, loading zippers onto a applying device for placing zippers onto a film, and successively attaching the zippers onto the film in precise spaced apart locations.

SUMMARY OF THE INVENTION

The present invention provides a continuous assembly apparatus for bonding extruded plastic strip fasteners or "zippers" transversely at regular intervals to a printed or unprinted web.

The invention contemplates an apparatus for applying zippers to a web such as a plastic film, including: at least one draw roll for pulling a length of film past a zipper applying station; a turret located at said zipper applying station and arranged adjacent a length of film, the turret having spaced apart grooves therein around an outer surface thereof, each groove for holding a zipper therein, the turret driven in rotation to position successive grooves across a surface of the film; a zipper placing mechanism for placing successive zippers into successive grooves of the rotating turret; and a zipper feed mechanism for indexing a length of zipper material from an elongate supply of zipper material into the zipper placing mechanism, and for cutting off the length from the elongate supply of zipper material, the length corresponding to one zipper.

The preferred embodiment apparatus performs: a continuous unwind of film, an indexed progression of a length of the film, a continuous progression of zipper material laterally toward the length of film, an indexed progression of the zipper material, a fusing of male and female interlocking portions of the zipper material, a cutting of zipper material into individual zippers, a placing of individual zippers to a surface of the film, an attachment of the individual zippers to the film, and a continuous rewind of the zippered film into a roll of bag mating film stock.

At an upstream end in a processing direction of the film through the apparatus, an unwind stand includes a supply of film wound on a supply roll. The film is unwound by turning the supply roll, and is threaded through a dancer roll station for adjusting tension of the film and the speed of the supply roll.

The film is delivered to an infeed station. The infeed station provides for a continuous-to-intermittent motion of the film through use of an infeed dancer roll station. The dancer roll station creates a repeating accumulation of film which acts as a buffer during apparatus operation.

At a zipper applying station downstream of the infeed station the film is processed in an intermittent fashion: draw film, apply zipper, draw film, etc. During operation, the film is indexed in precise increments, e.g., one package length, into the body of the zipper applying station. This indexing can be done "in register" if the film is printed.

An outfeed station located downstream of the zipper applying station includes a downstream set of draw rolls which feeds film out to a single, or multiple roll outfeed dancer roll station. This outfeed dancer roll station accumulates each indexed draw of film. The accumulation is fed out of the outfeed dancer roll station by a downstream set of nip rolls that are driven at the same speed as the infeed and speed trimmed by the outfeed dancer. Thus the film is fed out of the outfeed station at the same average speed as it is fed into the infeed station.

At a mid span of the apparatus is located the zipper applying station. Here, a prepared zipper is placed on a turret, the turret is rotated into position with the zipper underlying the film, and the zipper is sealed onto the film with a heat sealer.

The turret includes sealing platens providing grooves which receive individual zippers successively. The turret is mounted so that the sealing platens are elongated perpendicular to the direction in which the film flows. The sealing platens are spaced apart around the perimeter of the turret, rotatable to positions corresponding to turret stations. The turret stations on the turret rotate about an axis perpendicular to the direction of film flow.

The turret has a plurality of turret stations. In a presently preferred embodiment four turret stations are used but more or less than four is contemplated by the invention. In operation, a bottom station receives a new zipper, while the next station is preheated and\or inspected by a sensor for the presence of a zipper and/or a peel seal is produced. A station on top of the turret is applying a zipper to the film. The fourth station, one position clockwise from the top, is idle.

Each rotational quarter cycle simultaneously applies a zipper, loads a new zipper, preheats a loaded zipper, and checks to see that there is a zipper in the station that is next set for application.

Zipper material in the form of interlocked profile strips, typically includes first and second interlocked bodies and film body flange portions connected to the bodies. The interlocked bodies typically have an engagable rib and groove interface which can be repeatedly opened and closed. Such zipper material is described for example in U.S. Pat. No. 5,461,845.

Zipper material composed of two elongate interlocked profile strips, is pulled from a zipper unwind stand by a set of servo-driven nip rolls. The zipper material is pulled in a direction perpendicular to the film flow direction in the zipper applying station. A zipper material dancer roll station allows for an indexed feed of zipper lengths from a continuous feed from a zipper material supply roll located on the zipper unwind stand.

The zipper material from the zipper unwind stand is conditioned by a zipper preparation device. The zipper preparation devices intermittently "crushes" the continuous zipper material synchronized with each time the zipper material stops to be cut off into an individual zipper. This "crush" is done by a device which welds the interlocking bodies of the zipper material together and flattens them. At a middle portion of this flattened spot, the zipper will be cut at a cutting station further downstream in the direction of zipper material flow. Thus, each individual zipper is separated from the zipper material with one-half of a crushed spot on each end.

Crushing serves two purposes, mechanically bonding of the two mating zipper parts and also making a barrier seal possible. The crush is not limited to the spine of the zipper but may include the flange portion or some part of the flange portion.

The zipper material is fed to length into a tray of a zipper receiving station and held there by a subsequent clamping action. Through an upward thrust of the tray, the zipper material is placed on the turret, clamped and cut simultaneously. The zipper material is clamped on both sides of a knife at the cutting station as the knife completes its cutting stroke.

The uppermost turret position is the sealing station where the zipper body flange portions are sealed to the film. A zipper that was earlier put onto the bottom station of the turret and held by vacuum, rests freely, or under reduced vacuum, at the sealing station on top of the turret.

A heated seal bar is pressed down onto the film and presses the film against the zipper, and both against the sealing platen. Heat is transferred through the film to the zipper body flange portion and the zipper is thus fastened to the film.

As additional features of the invention, a provision for sensing the absence of a zipper or a mis-applied zipper misaligned in the turret, during processing is contemplated. Initially, a zipper is sensed on the turret at a position between the loading station and the sealing station. Absence of a zipper, and/or a misapplied zipper here will cause a warning flag to be attached downstream in the film direction. Absence of and/or misapplication of two successive zippers will stop machine. Other control schemes are possible.

A rewind stand receives the film from the outfeed station. The rewind stand includes a tension dancer roll system for insuring proper tension during rolling up of the zippered film. A rewind roll winds up the zippered film at a substantially continuous rotation.

Thus, the invention provides a continuous manufacturing apparatus which effectively and efficiently applies zippers transversely to a moving film supplied from a continuously rotating supply roll, and rewinds the zippered film onto a continuously rotating rewind roll.

Other features and advantages of the present invention will become readily apparent from the following detailed description of the accompanying drawings, and the appended claims.

DETAILED DESCRIPTION OF THE PREFERRED EMBODIMENTS

Figure 1:
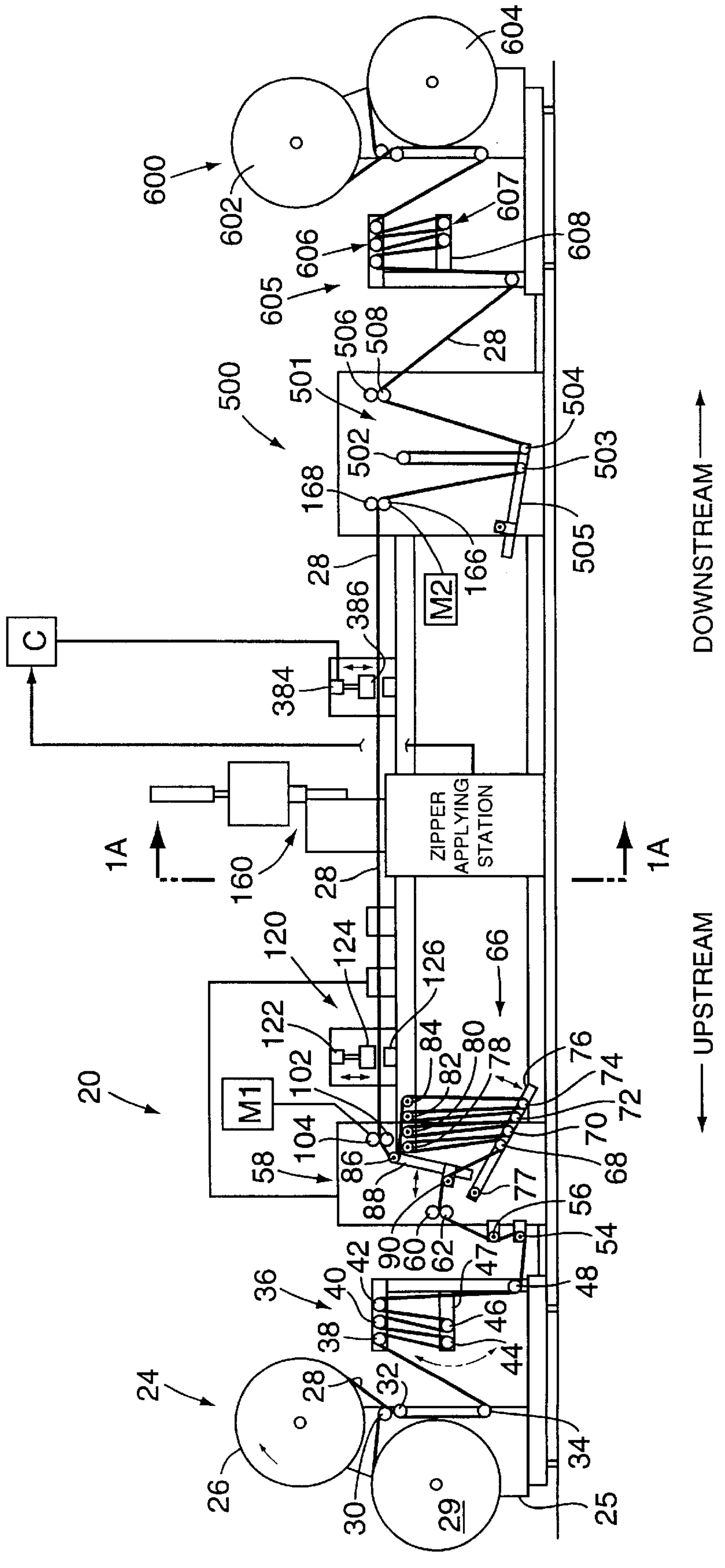
FIG. 1 is a schematic elevational view of the apparatus of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an apparatus 20 for applying zippers to a film of bag-forming stock. The apparatus includes a film unwind stand 24 including a frame 25 holding supply roll 26 of a web or film 28. The web can be any suitable material such as paper, plastic or other material. An alternate roll 29 of film is located-on the frame 25 to facilitate a quick change-over when the first roll is depleted. While the roll 29 is unwinding, the supply roll can be replenished. Rather than the unwind stand 24, a different film source can be used such as a fan-folded source of film or film delivered directly from an in-line film extruder.

The film 28 is threaded through free-wheeling rollers 30, 32, through an edge guide sensor 32A and around a roller 34 to a tension dancer roll station 36. The tension dancer roll station 36 includes a plurality of stationary free-wheeling rollers 38, 40, 42 and a plurality of free-wheeling rollers 44, 46 mounted on a pivotable dancer arm 47. The film 28 is wrapped in serpentine fashion over the rollers 38, 44, 40, 46, 42 in that order respectively, and then around a free-wheeling stationary roller 48.

The position of the dancer control arm 47 is maintained by feedback from a potentiometer (not shown) that is actuated by the dancer arm 47. The closed loop vector control used can be SAFETRONICS VG5. This drive has the necessary PID (proportional, integral and derivative control) feedback algorithm for dancer arm positioning.

Prior to going through the dancer roll station 36, the film is routed through an edge guide, e.g., a FIFE edge guide unit 32A, so that it stays in the same position, side-to-side, entering the apparatus. Roller guides 54, 56 direct the film 28 into an infeed station 58. The unwind stand 24 is movable transversely (i.e., into and out of the page) while the dancer station 36 is stationary with respect to the infeed station 58. The edge guide unit 32A controls a hydraulic positioner (not shown) to transversely position the frame 25 to keep the rolls 26, 29 and the film 28 aligned axially through the apparatus 20.

Static eliminators (not shown) are mounted to discharge the plastic film before it enters the infeed station 58.

The film 28 enters the infeed station 58, through infeed nip rolls 60, 62 that are driven by an AC motor which is controlled by a variable frequency alternating current (VFAC) drive. The drive can be a SAFETRONICS PC3. The speed of the motor is adjusted by an infeed potentiometer (not shown) signal connected to the VFAC drive.

The film 28 is next threaded through an infeed dancer roll station 66 which includes a plurality of free-wheeling rolls 68, 70, 72, 74 carried on a pivotable first dancer control arm 76, pivoted about the point 77, and stationary free-wheeling rolls 78, 80, 82, 84. The film is threaded in serpentine fashion around the rolls 68, 78, 70, 80, 72, 82, 74, 84, in that order respectively.

The film is then threaded around a single roll dancer 86. The single roll dancer 86 is carried or a second dancer control arm 88 which pivots about a guide roll 90. The infeed potentiometer (not shown) follows the first dancer control arm 76, i.e., when the dancer moves up it moves the wiper of the potentiometer up. The first dancer control arm 76 is down when the apparatus 20 is stopped. This creates an accumulation of film in the dancer station 66 which acts as a buffer during apparatus operation.

When the apparatus 20 is operating, the first dancer control arm 76 is pulled up by the film 28. Thereafter, a motor drives the nip rolls 60, 62 at a speed proportional to the height of the first dancer control arm 76, i.e., the height of the wiper of the infeed potentiometer (not shown).

The second dancer control arm 88, by pivoting about the guide roll 90, takes up the sudden, repetitive demands for film that are created by each film draw cycle. The apparatus 20 processes the film 28 in an intermittent fashion, draws film, applies zipper, draws film, etc. The second dancer arm 88 allows the continuously running film 28 from the infeed nip rolls 60, 62 to be processed intermittently by paying out film each draw cycle and accumulating film during zipper application. A pair of draw rolls 102, 104 draws film from the single roll dancer 86 during the draw cycle.

As needed, perforation of the film is done at a perforation station 120. For example, a frangible joint 121, shown in FIG. 15, made of perforations 121a can be cut into the film 28 at bag length intervals. The joint 121, when opened provides access through a front wall of a subsequently formed bag to access the zipper interlocking profile strips, and the contents of the bag.

The perforation station 120 includes an actuator 122, a cutter 124 and a backup plate 126. The perforation station 120 is located downstream of the draw rolls 102, 104. The perforation station operation is synchronized with the zipper sealing dwell, the period of time that a zipper is being sealed to the film. Since the film 28 must stop for a longer period of time to be sealed to the zipper, the perforation is simply done at the beginning of that stopped period. The actuator 122 pushes the cutter 124 through the film 28 against the plate 126 to a preset depth. The knife geometry determines the amount of film that is cut and how much is left uncut. What is left uncut determines the size of the connecting tabs and therefore the strength of the perforation.

The film 28 is indexed in precise increments (one package length) into a zipper applying station 160. Downstream draw rolls 166, 168 are driven by a servo motor M2 and run in ratio to an upstream servo motor M1 which drives the upstream draw rolls 102, 104, i.e., during a draw cycle the motor M2 is turned a different number,of pulses than the motor M1. The upstream and downstream draw rolls 102, 104; 166, 168 are used to index-to-length the plastic film to each product length.

It is desirable to have the film under tension while being processed. To create tension in the film between the two sets of draw rolls 102, 104; 166, 168, the separate servo motors M1, M2 drive the draw rolls in ratio to one another. The downstream rolls run in ratio to the upstream roll but this could be reversed. When downstream follows upstream, a ratio of 1.0 or greater is required. Normally, the ratio number of turning pulses of motor M2): (number of turning pulses of motor Ml) of approximately 1.02:1 is used. A ratio of about 1.05:1 would result in a very tight film, while 1.0:1 would result in a loose film. This ratio is an adjustable value and is changed to accommodate different film characteristics. The film is made tighter or looser by adjusting this number up or down respectively.

Servo draw rolls allow very precise indexed length and degrees. This also includes registering printed film. The registration algorithm is the same as that used in FMC, Bauknecht U.S. Pat. No. 5,000,725. A scanner, such as the Datalogic TL-10, can be used for sensing the marks on the film.

As an alternative to servo controlled draw rolls, a closed loop vector drive or other precision positioning motor drive can be used.

The upstream draw rolls 102, 104 and the downstream draw rolls 166, 168 are both made up of one solid roll and one set of segmented rolls. The lower roll is solid and the upper roll is segmented but this can be reversed. The segmentation allows for the nip between upper and lower rolls to grab the film 28 on each edge while leaving the middle zippered section unnipped. This avoids running the film through a nip while the seals are still warm and possibly not secure. How much of the middle section left unnipped is a mechanical adjustment. The upper segmented rolls are similar to wheels on an axle, and the wheels can be moved back and forth across the shaft and clamped in position. Unused roll segments are slipped completely off each end and are not in contact with the film web.

Figure 1A:
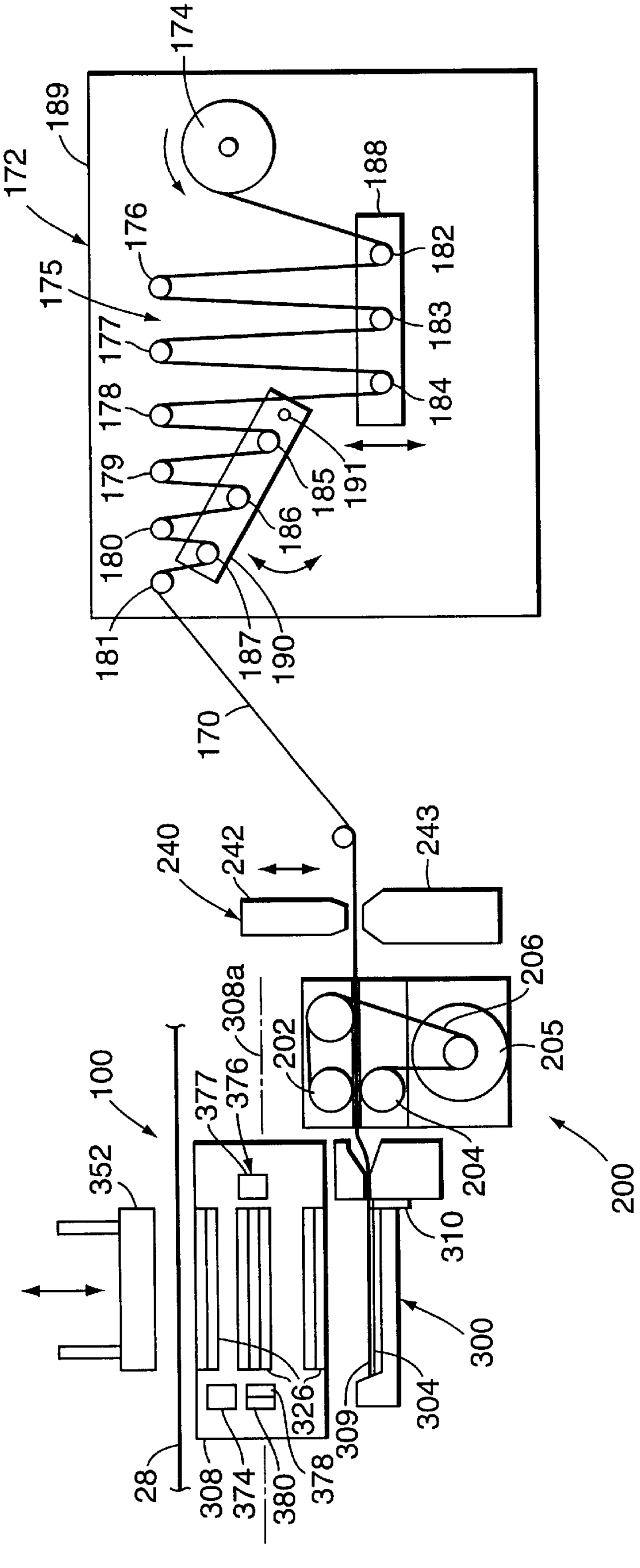
FIG. 1A is a schematic sectional view taken generally along plane 1A—1A of FIG. 1.

As shown in FIG. 1A, a zipper unwind stand 172 includes one or more rolls 174 for continuous dispensing of zipper material 170. The zipper material 170 is circulated around a zipper material dancer 175. Within the dancer 175 the zipper material is threaded around a plurality of stationary free wheeling rolls 176, 177, 178, 179, 180, 181 and a plurality of vertically movable rolls 182, 183, 184 and a plurality of pivoting rolls 185, 186, 187. The vertically movable rolls are carried on a bracket 188 which is guided for vertical movement to a frame 189 of the stand. The pivoting rolls are carried on a control arm 190 which is pivoted about the point 191 to the frame 189. Movement of the bracket 188 and control arm 190 allow for rapid dispensing of zipper material due to accumulation and depletion of zipper material in the dancer 175.

Zipper material 170 is pulled from a zipper unwind stand 174 by a zipper feed station 200. The zipper feed station 200 includes a set of nip rolls 202, 204 driven by a servo motor 205, via a belt 206. Servo-driving the nip rolls 202,204 allows the zipper material 170 to be fed out to a precise length required and therefore eliminates waste of zipper material.

The zipper material is composed of two interlocking profile strips each having a fastener body interlocked with the respective other fastener body. The two interlocked bodies constitute the zipper spine 170*a*. Each body is carried by a body flange 170*b*, 170*c* respectively. The body flange portions 170*b*, 170*c* extend outwardly on opposite sides of the zipper spine 170*a*.

A zipper crushing device 240 crushes the endless zipper material 170 each time the zipper material 170 is indexed by the rolls 202, 204 and is stopped. This crushing device 240 welds together and flattens the zipper interlocked bodies (which constitute the zipper spine 170*a*), creating intermittent flattened spots 241.

Crushing serves two purposes, mechanically bonding the two mating zipper parts and making a barrier seal possible. The crush is not limited to the spine of the zipper but may include the body flange portions or some part of the body flange portions. Zipper crushing can be done with an ultrasonic crusher such as a BRANSON Model No. 900BCA. The crushing device includes a reciprocating "punch" 242 and an "anvil" 243. The crushing can be accomplished by other methods such as by a heated bar, a high pressure crushing device, or a hot knife, or other appropriate methods.

The nip rolls 202, 204 pull the already-intermittently-crushed zipper material 170 through a guiding mechanism and feed it to where the zipper material is cut. The guiding mechanism includes zipper guide plates 260, 262 which closely surround the zipper material 170. The edges of the zipper flange portions are guided.

Figure 3:
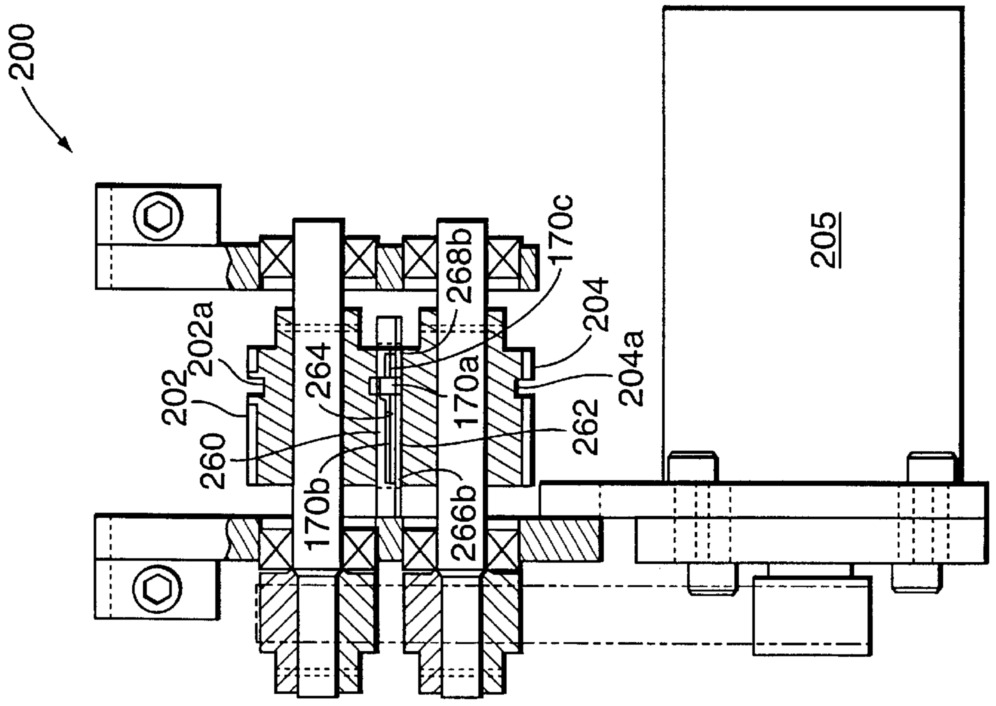
FIG. 3 is a front view of the zipper feed shown in FIG. 2.
Figure 2:
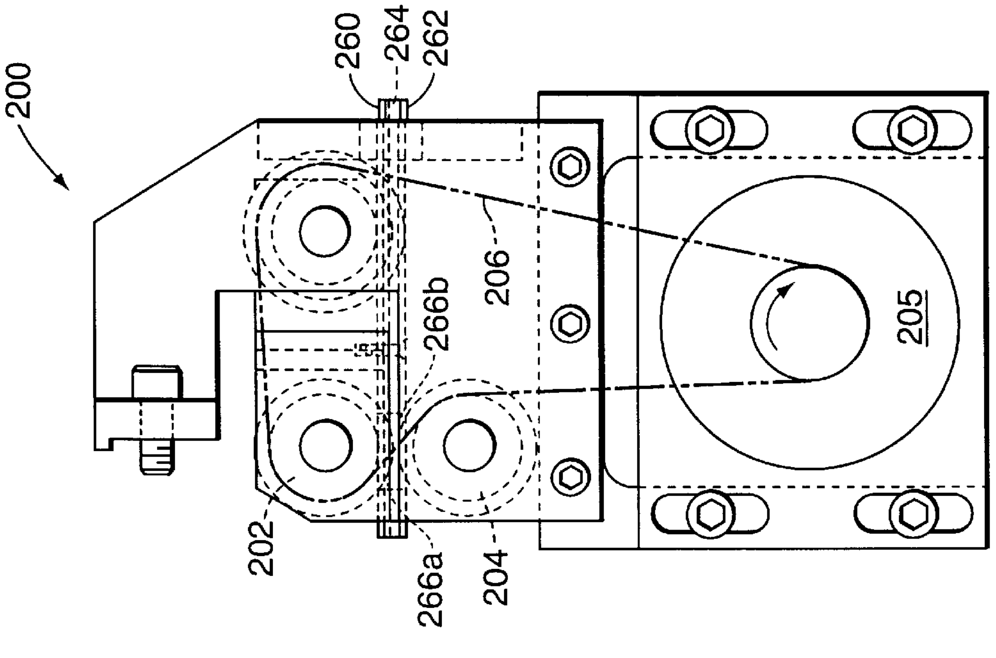
FIG. 2 is a side view of a zipper feed of the present invention.
Figure 4:
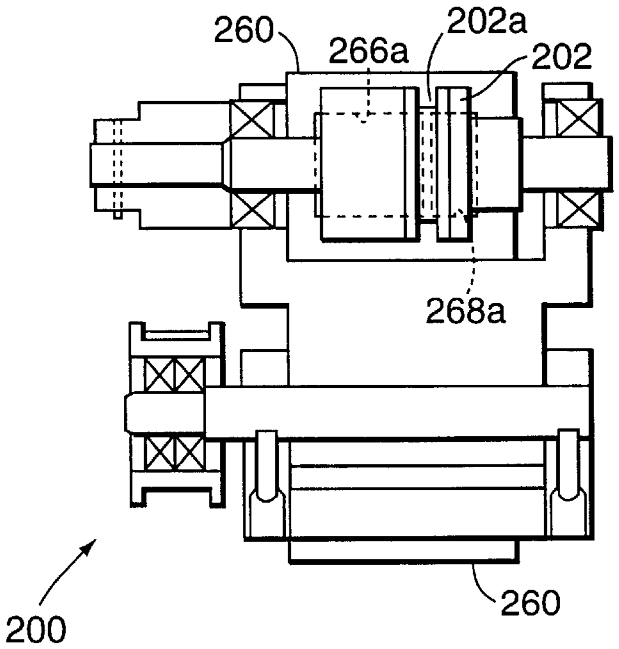
FIG. 4 is a top view of the zipper feed shown in FIG. 3.

FIGS. 2 through 4 show the zipper feed station 200 in more detail. The nip rolls 202, 204 are about the same width as the zipper material 170. The nip rolls 202, 204 have grooves 202*a*, 204*a* to conform to a contour of the zipper feed roll guide plates 260, 262. The zipper material 170 is sandwiched between the guide plates 260, 262. The plates are shaped to create a channel 264 to accept the profile of the zipper material 170.

The zipper spine 170*a* is located near the middle of the channel 264 and the flanges 170*b*, 170*c* to the sides. Both plates 260, 262 are similarly contoured to form the channel 264 therebetween. Each plate 260, 262 has a small pair of side-by-side rectangular windows 266*a*, 268*a*; 266*b*, 268*b* respectively through a thickness of the plates. The lateral clearance between the windows of each pair 266*a*, 268*a* and 266*b*, 268*b* is equal to the groove in the nip roll 202, 204 for that plate, upper or lower, with some tolerance.

When the plates are put together to create the zipper guide channel 264, the nip rolls 202, 204 protrude through the window pairs, upper window pair 266*a*, 268*a* and lower window pair 266*b*, 268*b*, and create a nip point within the confines of the zipper channel 264. During its travel through the zipper feed station 200, the zipper material 170 never leaves the confines of the zipper channel 264 and is completely controlled throughout the station 200. It is under control at the high zipper acceleration rate required which can exceed 5,000 inches per second$^2$. The guide plates 260, 262 can be modified to accommodate different zipper contours and widths.

As illustrated in FIGS. 1A, and 5 through 7, the zipper material 170 is precisely fed to length by the servo driven nip rolls 202, 204 into a zipper receiving station 300, through a receiving guideway 301 having a top wall 302 and a bottom wall 303. Through an upward thrust of a tray 304 of the zipper receiving station 300, the zipper material 170 is placed onto a turret 308, clamped and cut at a central location within a flattened spot 241, simultaneously to form an individual zipper 309.

A knife 310 mounted to an air cylinder 312 is actuated when the zipper material 170 is in position against the turret 308, having travelled as far vertically as it can. To ensure that the zipper material 170 does not move while being cut, it is clamped on both sides of the knife 310. The zipper material 170 is clamped on the turret side of the knife by the tray 304 and clamping plates, described below.

On the feed station side of the knife, springs 316 hold clamps 318 ahead of the knife edge and the clamps 318 make contact and press against the zipper material 170 as the knife undergoes its cutting stroke. The knife 310 is moved vertically by a knife block 319 connected to a pneumatic actuator 320. The knife block 319 and knife 310 move vertically with respect to spring guides 321 and the knife block compresses the springs 316 against the clamps 318. The clamps 318 are thus urged against the zipper material 170 which is pressed to the top wall 302 of the guideway 301.

The knife can also be provided with a fusing mechanism such as a heated or ultrasonic mechanism to fuse the zipper interlocking bodies together at the location of the cut. Such a fusing mechanism can be used in lieu of the crushing device 240, previously described.

FIGS. 1A, and 9 through 12, illustrate the turret 308 in detail. The turret 308 has a plurality of zipper-holding-positions such as a plurality of rubber strips 326 having grooves 324. Each groove is successively positioned for receiving a zipper 309. The rubber strips 326 form sealing platens. The rubber strips 326 are connected to the turret 308 by a plurality of screws 327.

The turret 308 is mounted so that the sealing platens 326 and grooves 324 are perpendicular to the direction in which-the film flows, i.e., transverse to the film flow direction. The turret 308 has four stations. Viewing the four stations from the operator side of the machine one-by-one in a clockwise direction, a loading station 340 receives a new zipper, while a preheating station 344 preheats and/or inspects for the presence of a zipper, or a misaligned zipper and/or forms a peel seal. A sealing station 348 on top applies a zipper to the overlying film. The fourth station, one position clockwise from the top is an idle station 349. The turret rotates clockwise if viewed from the operator's side of the machine. Each one quarter rotary cycle simultaneously applies a zipper, loads a new zipper, preheats a loaded zipper and\or checks to see that there is a zipper in the station that is next up for application to the film.

During the return of the tray 304 of the zipper receiving station 300 from the turret 308 the tray 304 must release the zipper flanges 170b, 170c while retracting, so as not to pull the zipper 309 from the sealing platen. The design of the zipper receiving station makes this possible.

Figure 5:
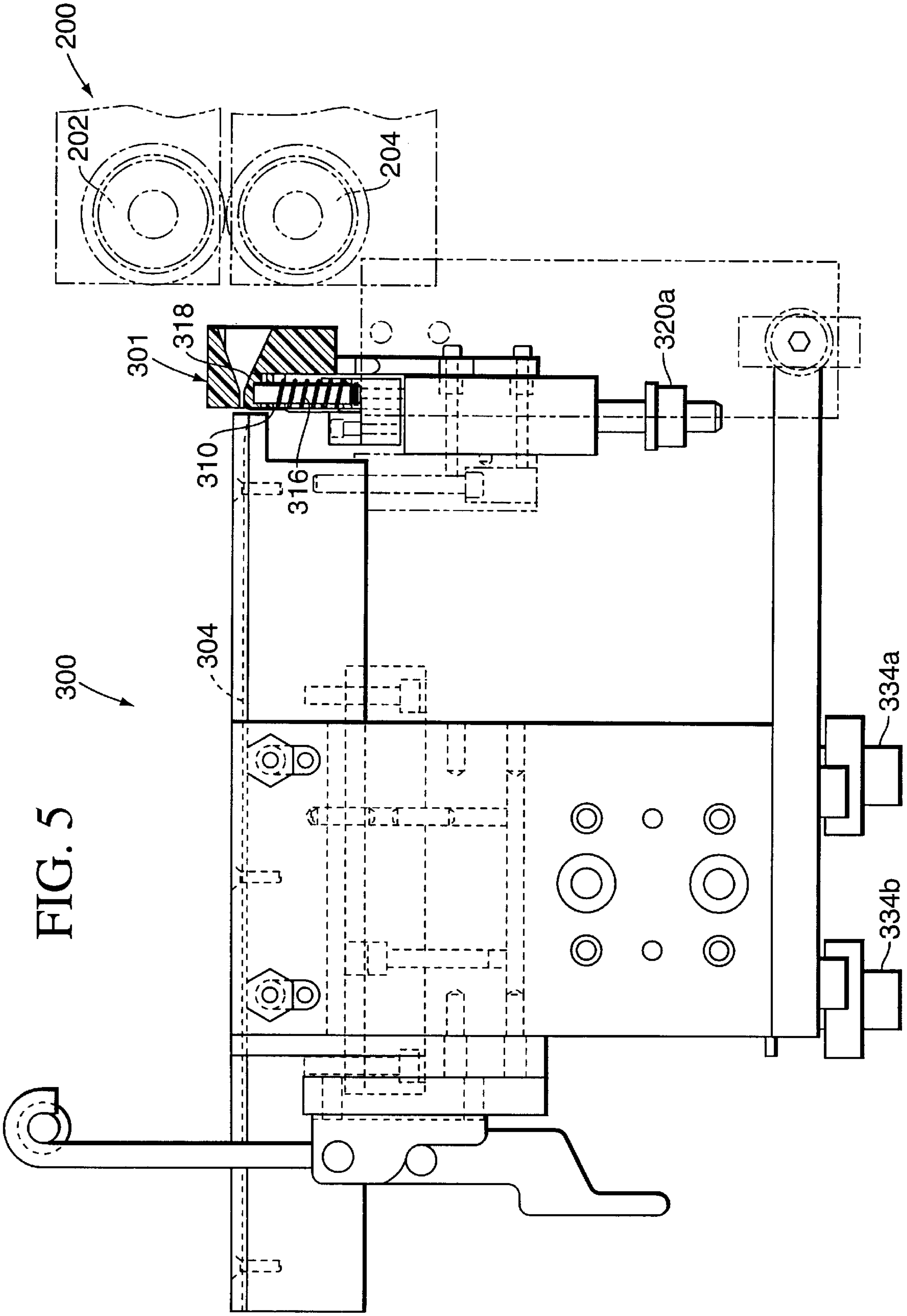
FIG. 5 is a side view of the zipper feed in conjunction with a zipper receiver of the present invention.
Figure 6:
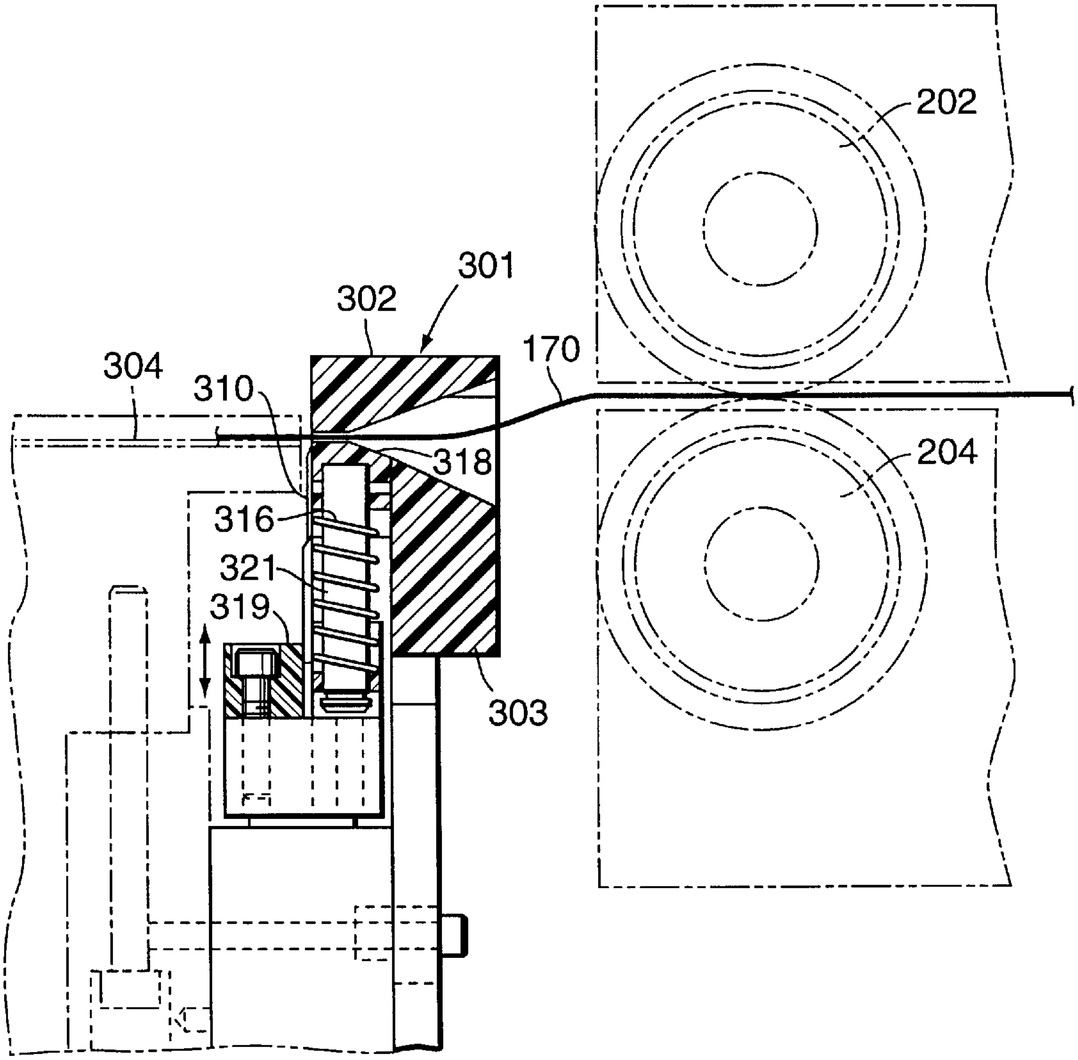
FIG. 6 is an enlarged side view of a portion of FIG. 5.
Figure 7:
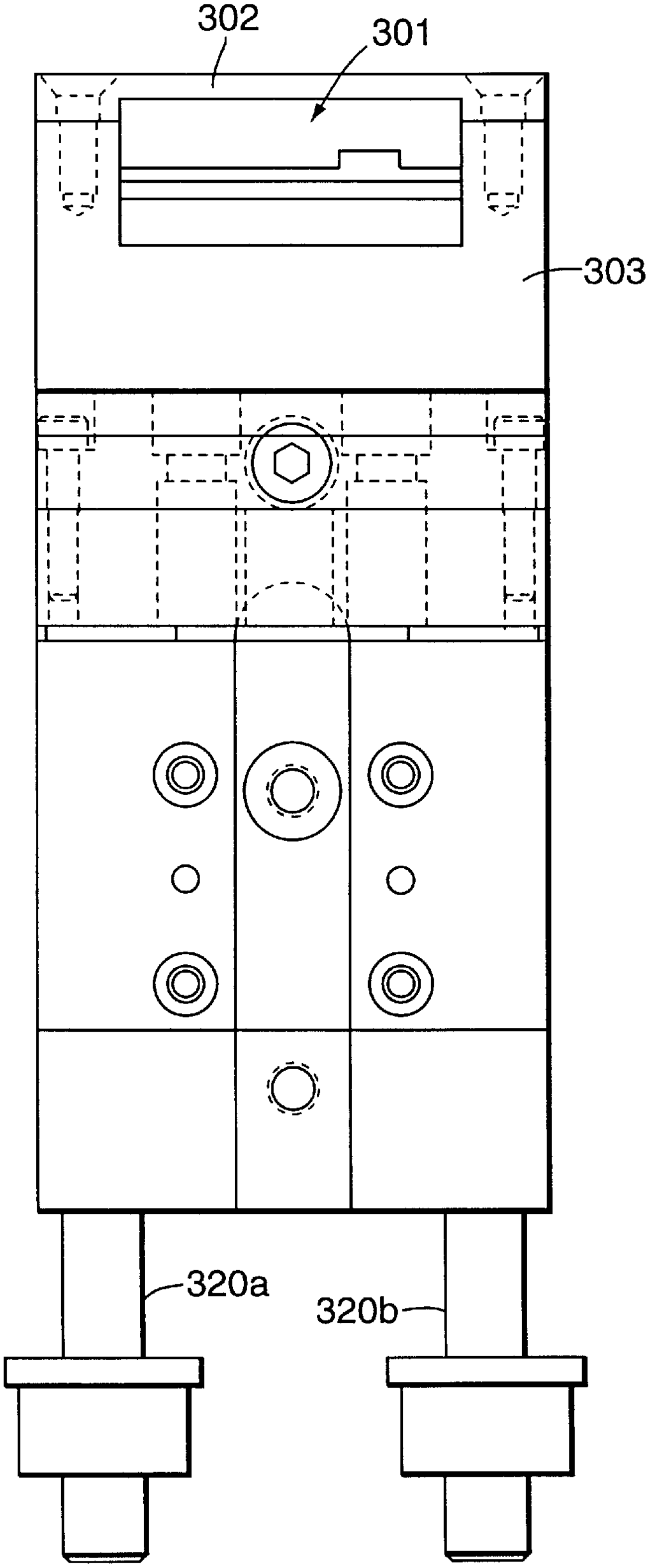
FIG. 7 is a front view of the zipper receiver shown in FIG. 6.
Figure 8:
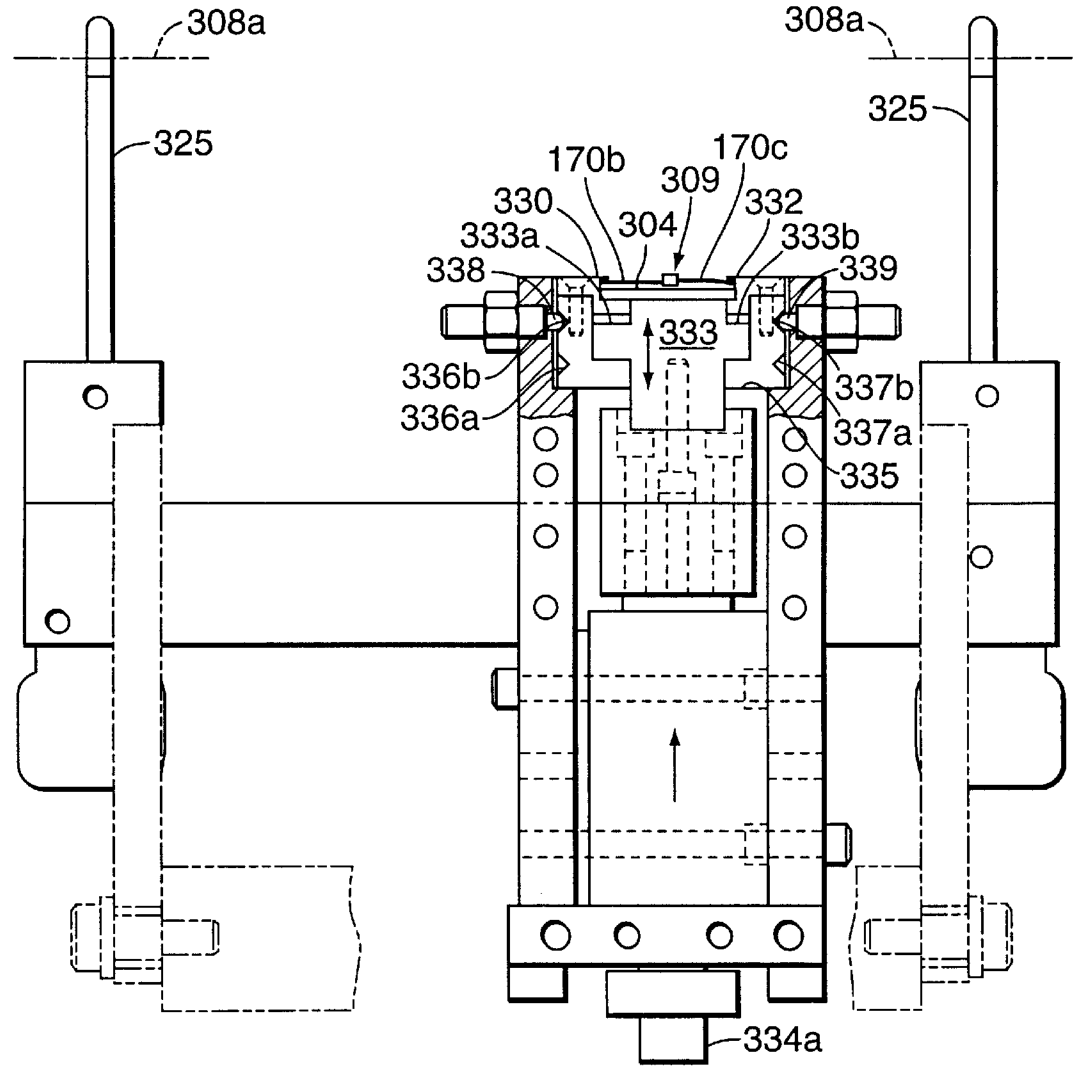
FIG. 8 is a partial sectional view of the zipper receiver shown in FIG. 5.
Figure 10:
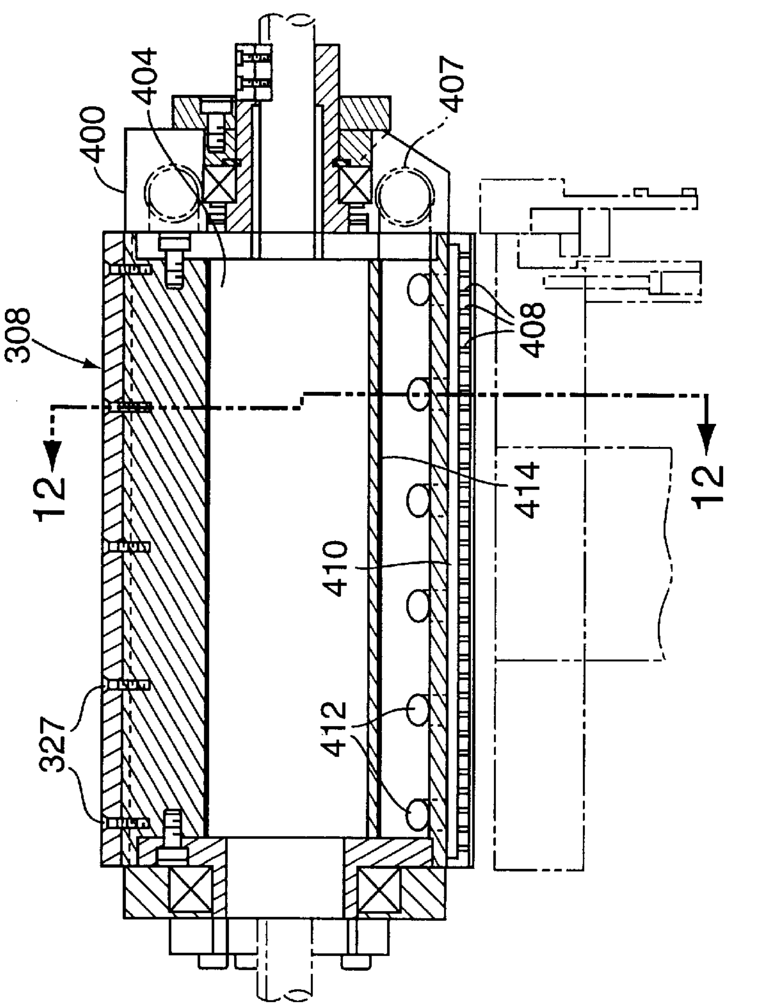
FIG. 10 is a sectional view taken generally along the line 10—10 of FIG. 9.
Figure 9:
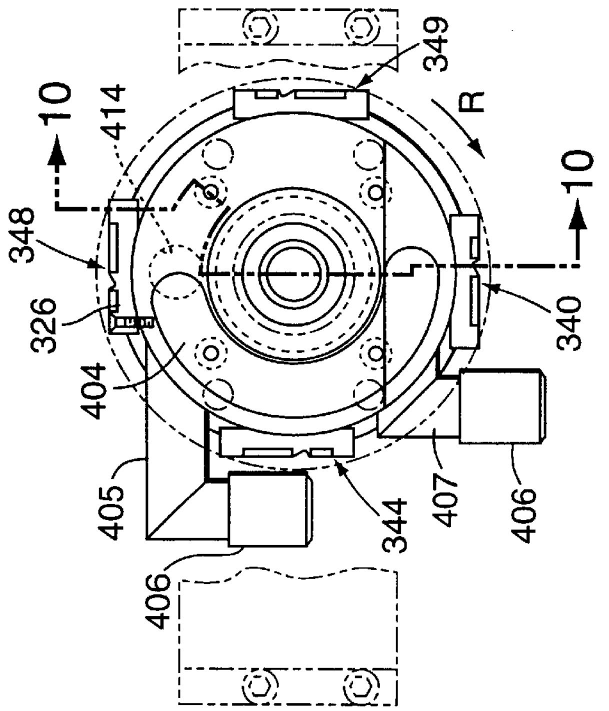
FIG. 9 is a side view of a zipper installation turret device of the apparatus shown in FIG. 1.
Figure 12:
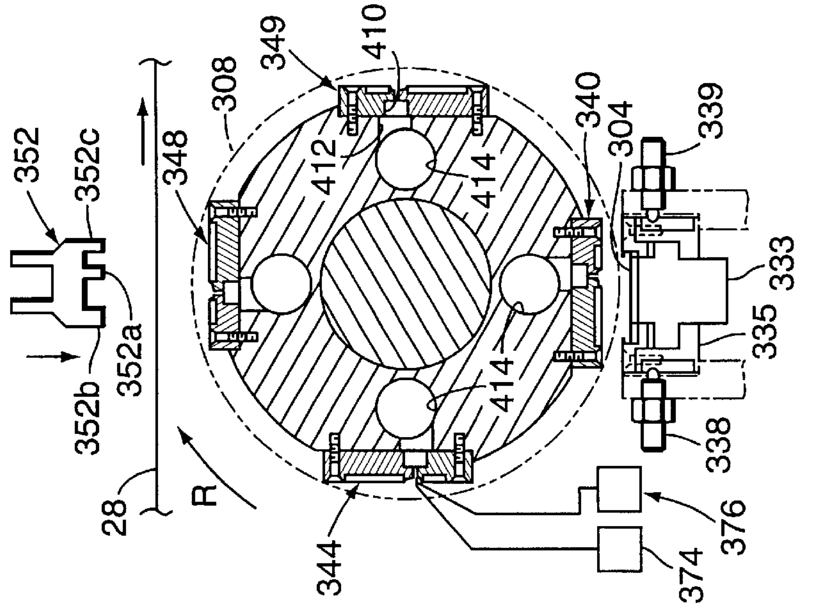
FIG. 12 is a sectional view taken generally along line 12—12 of FIG. 10.

As illustrated in FIGS. 5, 8, and 12, when the tray 304 of the zipper receiving station is forced up to the groove 324, the zipper flange portions 170*b*, 170*c* are gripped by spring-loaded metal plates 330, 332 on both edges. These plates 330, 332 clamp the zipper material 170 during cutting by the knife 310. The plates 330, 332 are the first to engage the zipper material 170 as the tray 304 is lifted toward the turret 308. There also the first to release as the tray 304 is retracted from the turret 308.

A middle section 333 moves up by force from pneumatic actuators 334*a*, 334*b*. The middle section lifts the tray 304, clamping the flange portions 170*b*, 170*c* against the spring loaded plates 330, 332. When raised a preset amount, the middle section 333 engages and lifts an outer section 335 a preset amount which is set by lower grooves 336*a*, 337*a* of the middle section 333. The lower grooves 336*a*, 337*a* are engaged by spring loaded detents 338, 339 carried by the outer section 335. When retracting downwardly, the tray is declamped first from the plates 330, 332 by retraction of the middle section 333 downwardly. The middle section, after a preset movement, forces the outer section 335 downwardly until the detents 338, 339 engage upper grooves 336*b*, 337*b* of the middle section 333. The tray 304 is then at its loading elevation to receive a new zipper 309 from the zipper feed station 200.

Returning to FIGS. 9 through 12, the zipper loading station 340 is at the bottom of the turret 308. The turret 308 includes an end plate 400 which does not rotate. The end plate 400 includes an arcuate vacuum channel 404 connected by two tubes 405, 407 via connector 406 at opposite ends of the channel 404 to a vacuum pump (not shown). Each groove 324 in the sealing platens 326 includes a plurality of small vacuum openings 408 connected by a vacuum passage 410 and branches 412 to a vacuum header 414 formed within the rotating turret 308. Thus, each sealing platen has an associated vacuum header 414.

The vacuum headers 414 are arranged to be in air communication with the arcuate vacuum channel 404 for a portion of the rotary travel of each vacuum header 414 in the direction R. Thus, when a vacuum is drawn by the pump 406, a vacuum is drawn through the small vacuum openings 408 of the grooves 324 at the loading station 340, the presealing station 344, and only partially at the sealing station 348. No vacuum is drawn on sealing platens traveling the arc between the sealing station 348 and the loading station 340 on the turret side across from the presealing station 344.

Figure 15:
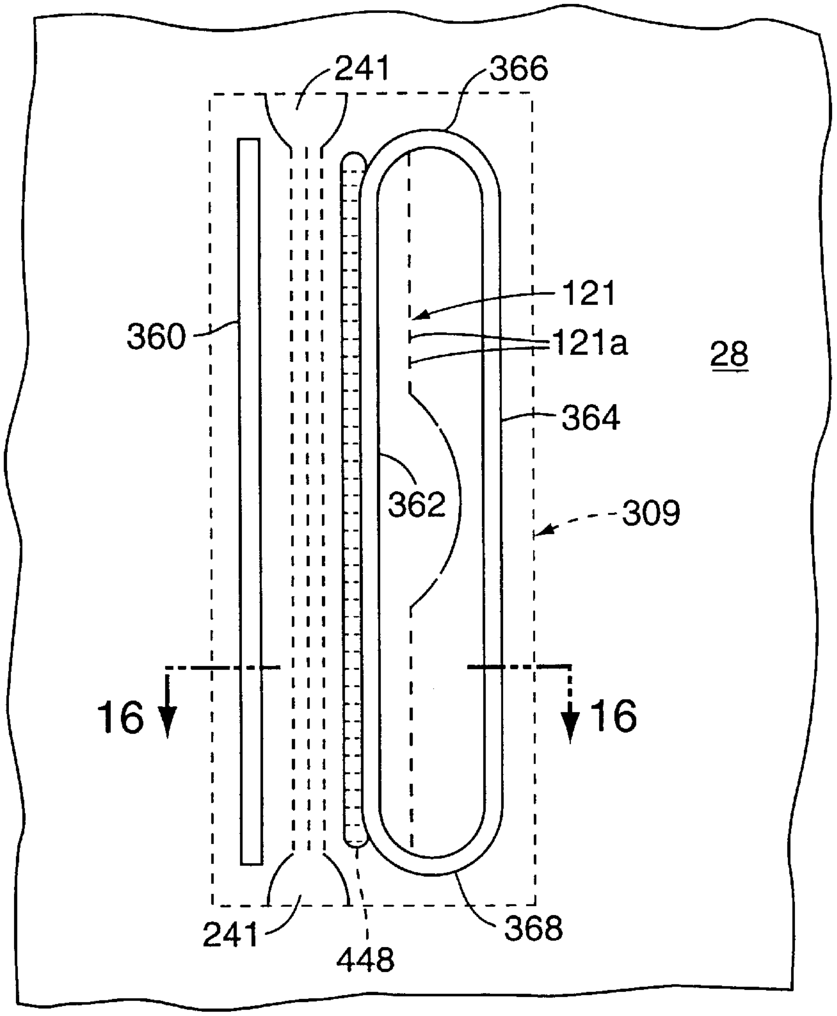
FIG. 15 is a plan view of a bag seal profile.
Figure 16:
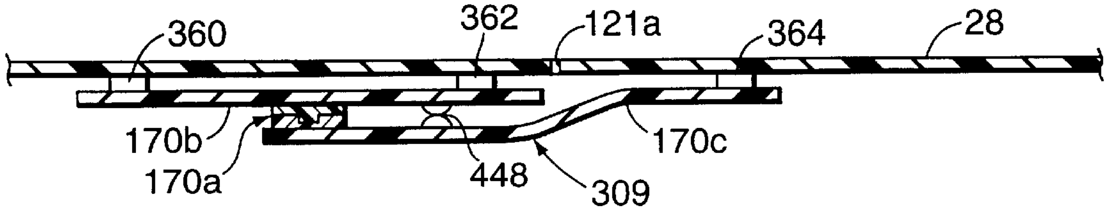
FIG. 16 is a sectional view taken generally along plane 16—16 of FIG. 15.

After the loading station 340 is the waiting station, or it can also be a presealing station 344 or peel seal area when presealing is needed. Peel seal material can be preapplied across the zipper 309 as shown in FIG. 15 (as track marks) and FIG. 16 and heat activated at the presealing station to form a peel seal 448. A peel seal is a heat activated seal which can form a hermetic seal but which can be separated relatively easily compared to a heat seal, without destructive ripping of the films.

Figure 13:
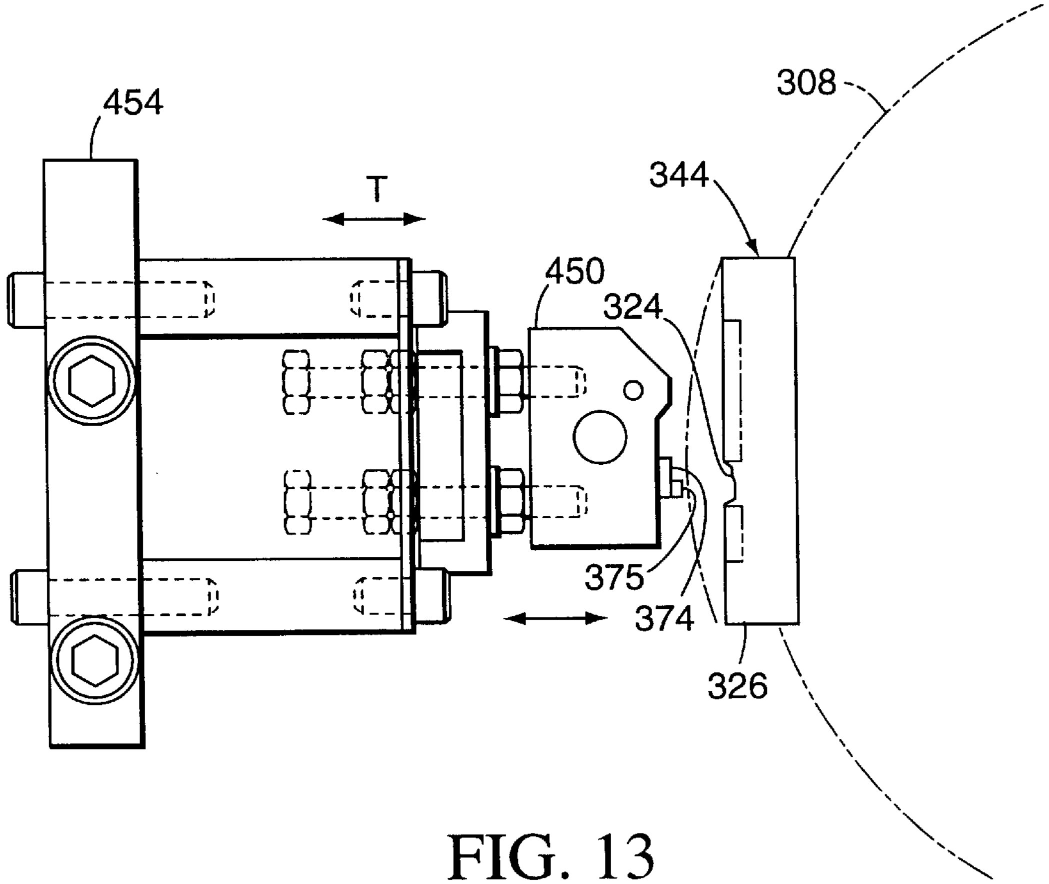
FIG. 13 is a front view of a preheating device of the apparatus of FIG. 1.

As shown in FIG. 13, a pre-seal bar 450 with a controlled temperature, moves out horizontally and presses against the zipper flange portions 170*b*, 170*c* for a seal dwell or main seal bar period of time. The zipper flange portions 170*b*, 170*c* are heated so that when the actual sealing takes place at the next station, the sealing station 348, less heat and time will be required. Using less time has an obvious advantage in increased cycle speed. Lower heat can also be important if the film being used in the process is especially heat-sensitive, e.g., unusually thin.

The entire time that a downstream zipper is being sealed to the film or "seal dwell time" can be used for presealing. In order for the presealing to be effective, the zipper that was presealed (preheated) needs to arrive at the sealing station 348 at the proper temperature. For most applications the preseal may or may not start at the same time as the downstream zipper is being sealed to the film, but that it will end at the same time as the downstream zipper-to-film seal ends. Presealing does not influence the cycle time because it takes up the same or less time than the downstream zipper-to-film seal.

The next turret position from the presealing station 344 is the sealing station 348 where the zipper flanges 170*b*, 170*c* are sealed to the film 28. The zipper, 309 that was put on the bottom of the turret 308 and held by vacuum is now resting freely, or held by reduced vacuum, on top of the sealing platen 326 which is at the sealing station 348.

A heated seal bar 352 extends down onto the film 28 and presses the film 28 against the zipper 309 and both against the sealing platen 326. Heat is transferred through the film to the zipper flanges 170*b*, 170*c* and thus the zipper is fastened to the film 28. The seal bar 352 is made to the length of the zipper being used.

The profile of the seal bar is dependent upon the seal design of the zipper material to the film. One zipper design requires three cross seals 360, 362, 364 shown in FIGS. 15 and 16. The end view of the seal bar 352 looks roughly like a capital E rotated 90° clockwise. The zipper spine 170*a* is straddled by two lateral seals 360, 362, made by a middle leg 352*a* and one edge leg 352*b* of the rotated E. The other edge leg 352*c* of the seal bar is located between edges of a shorter flange portion 170*c* and a longer flange portion 170*c*.

It is important to note that with the many variations and packaging requirements, the way that a zipper must be attached to the package will affect the seal bar(s). For example, if a barrier style package is required (airtight) then short end seals 366, 368 are needed, in the machine direction, on each end of the zipper to complete the barrier. Such a seal profile is shown in FIG. 15. The machine direction seals 366, 368 would not normally be put on at the turret station but downstream from the turret. When the peel seal 448 is used, it forms a substantially hermetic seal with the seals 362, 364, 366, 368 around the frangible joint 121.

The seal time of the seal bar 352 is the longest time demand for the process. The film can still be moving when the seal bar 352 begins to come down, which allows some additional film draw time, the time for indexed movement of the film by the draw rolls 102, 104; 166, 168. However, it is also necessary to allow some clearance when the seal bar 352 is retracted. This takes away from the available film draw time. Maximizing draw time available keeps the film acceleration down. The timing diagram, FIG. 14, clearly shows the relationship between the various components of this cycle.

Figure 14:
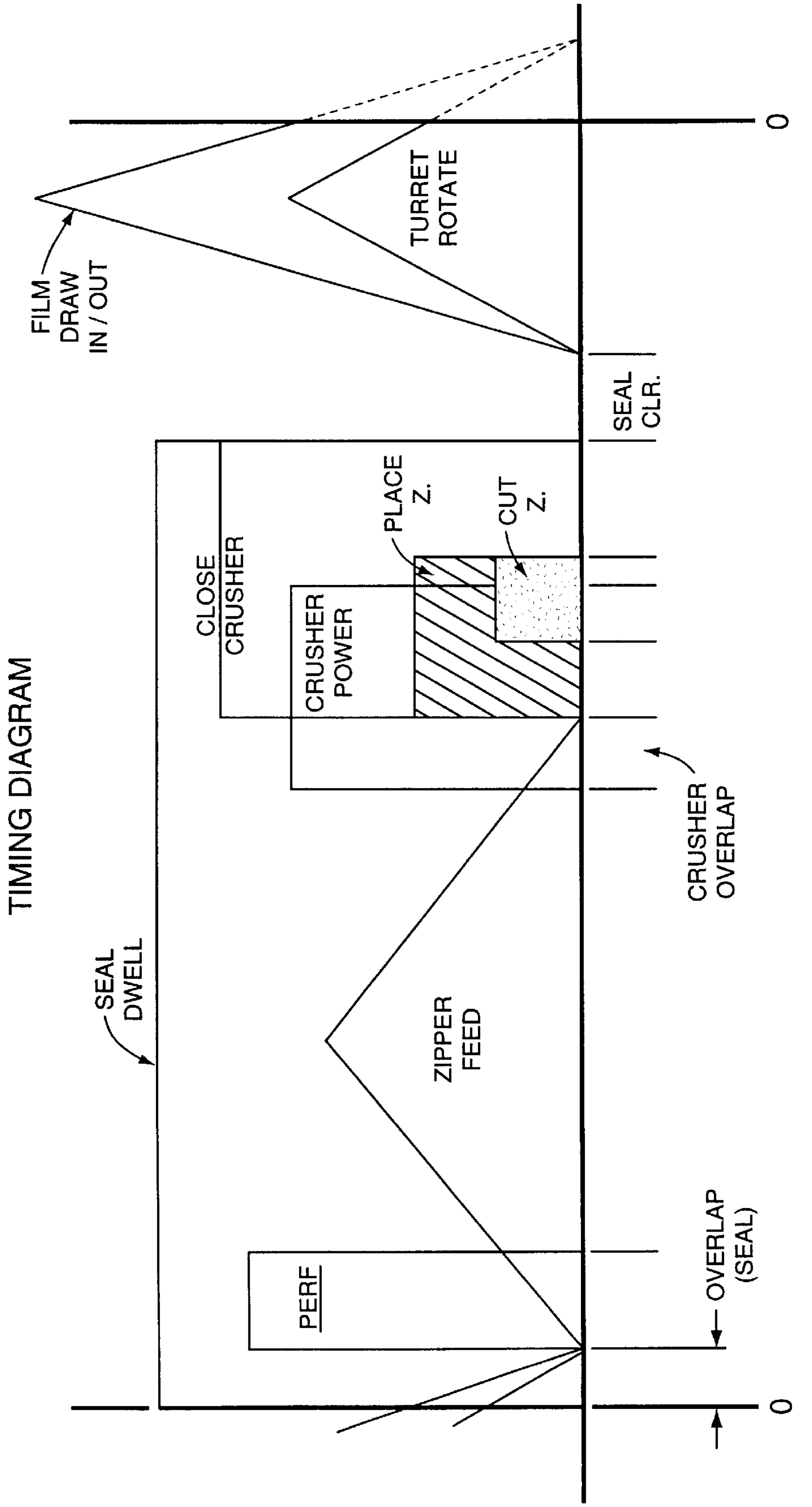
FIG. 14 is a timing diagram of the apparatus of the invention.

For the following discussion refer to the timing diagram FIG. 14. The horizontal axis represents degrees of the cycle, 0 to 360°. The vertical axis represents velocity only when the function being shown is a servo motor. For all non-servo functions, the vertical axis has no units because they are on/off functions. The non-servo functions take up time or degrees horizontally, but since they are signals for the solenoids they are shown without acceleration time or velocity representation.

Seal dwell takes up the greatest amount of time. It can be seen by the graph that all other functions are significantly shorter than seal dwell.

From left to right on the timing diagram, the first item is "overlap". Overlap is the amount of time (degrees) that it takes for the seal bar to move down onto the film. Since during this time, the seal bar is not in contact with the film, the film can still be moving as the seal bar is coming down. Notice that the previous draw profile crosses over 0° and ends at the end of overlap. "Perforation" (perf) puts a perforated pattern into the film. An air solenoid and cylinder actuate the perforator. The "seal dwell" block is comprised of three parts: the main transfer seal, the end seal, and the pre-sealer, if used. As shown in this diagram, they all have the same dwell time and are triggered together from the same output. They could operate independently if necessary because each is actuated by a separate air solenoid and cylinder. "Seal clearance" allows enough time (degrees) for the seal bar(s) to retract before the next film draw. "Film draw" advances the film one repeat length (product length). "Turret rotate" advances the turret one station to successively move zippers to the sealing position. These two functions are both servo motor driven.

The "zipper feed" is a servo motor velocity profile. "Zipper feed" takes up a portion of the "seal dwell". The zipper feed uses as little time as possible so that there is enough time to crush the zipper as described above.

In this timing diagram, crushing is being done with an ultrasonic device which needs some time to fully energize to an effective level. The ultrasonic device is turned on prior to making contact with the zipper. It is also turned off before it is retracted, to cure the weld while being held in place.

The zipper cutoff and placement also takes place at this time but it is a separate operation. "Cut-off" is done to the previously crushed zippers and takes less time than crushing.

In operation, it is sometimes necessary to either stop the apparatus or alternately mark places in a prepared film and zipper roll, where, for one reason or another, there is a zipper missing or misapplied. With a, mark, the operator using the zippered film is able to notice a bad package that is being made without a zipper.

The first place that a zipper is sensed is in the turret. During any sealing cycle, the station that is facing toward the infeed station of the apparatus, the presealing or waiting station 344, is examined for the presence of a zipper. A mechanical limit switch or a plunger switch 374, shown schematically in FIGS. 1A and 13, such as a MICROSWITCH Model SL1-H can be used. The plunger switch 374 is mounted to the preheat bar 450 and moves with the preheat bar against the sealing platen, 316. A plunger 375 of the switch is aligned with the slot 324 of the platen 326. If a zipper spine 170*a* is present, the plunger activates the switch. If a zipper is not found, the apparatus control C will signal a labeler 394 to apply a flag (label) 386 at that location. Checking for a zipper is meant to catch a serious problem with the zipper feeding system. If a zipper is not present, there exists the likelihood of a jam. If two successive zippers are not sensed, the control C will shut down the apparatus.

Figure 11:
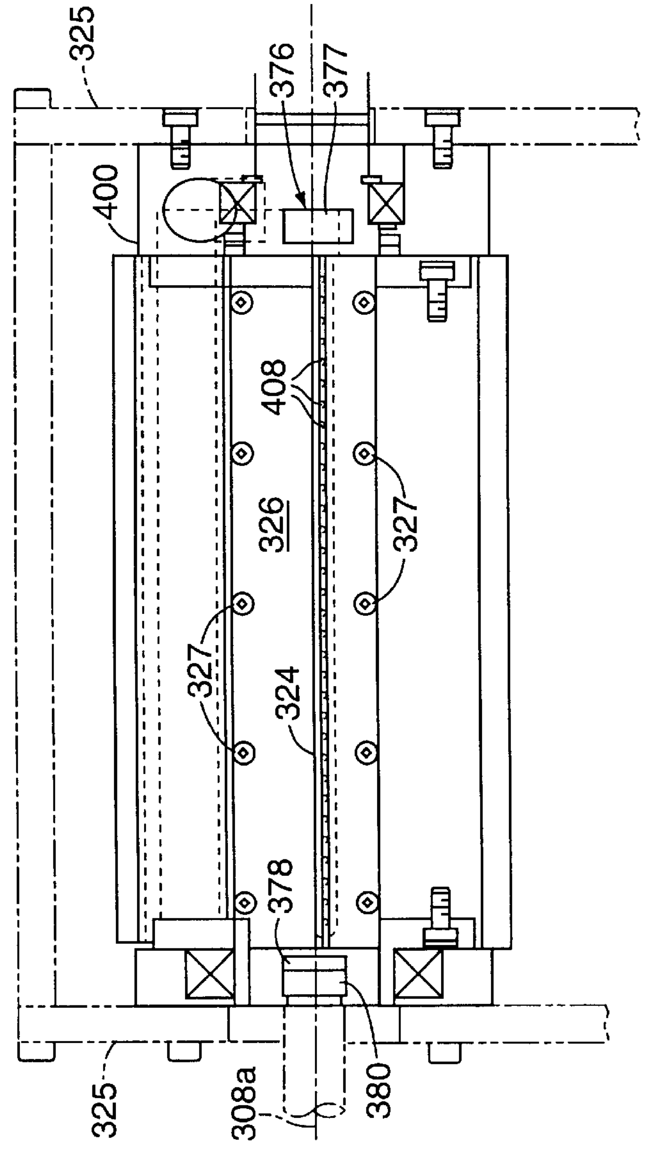
FIG. 11 is a top view of the device shown in FIG. 10.

FIGS. 1A and 11 illustrate another zipper sensing device. An optical sensor 76 determines whether a zipper is skewed or not properly seated in the slot 324. The optical sensor 376 includes a light emitter 377, a light window 78 and a light receiver 380. The light emitter 377 emits a beam of light in an axial direction across the turret 308 and within the slot 324. If the zipper spine 170*a* is not properly seated, the beam will not pass through the length of the slot 324, through an oval opening in the light windows 378 and will not be received at the light receiver 380. A misaligned zipper spine 170*a,* i.e., a zipper spine not properly seated within the slot 324, will block the light beam. As with the mechanical switch 374, a first missing zipper will cause the controller to signal the labeler 384 to attach a label to the film. A second consecutive missing zipper will shut down the machine. The optical switch can be a Keyence Corporation optical through-beam photoelectric switch Model PZ2-51 P with an A-slit window attachment.

The labeler 384 can be a MSI Tamp Labeler model number 3200. The labeler 384 requires a signal from the apparatus control system C, at the proper time, and it applies the label 386. There is room on the main support rails of the labeler 384 for a variety of attachments to apply patches, "Landeck" coupons, or other custom packaging attachments.

As the downstream set of draw rolls feed the film out of the tension process, the film is fed into an outfeed station 500. The outfeed station 500 includes a one, or multiple roll dancer 501. A two-roll dancer is presently preferred. The dancer 501 includes one stationary roll 502 and two rolls 503, 504 mounted on a dancer control arm 505. The function of the dancer 501 is to take up each index of film 28 while outfeed nip rolls 506, 508 are feeding the film 28 out of the outfeed station at a nearly constant rate.

The outfeed nip rolls 506, 508 get their speed reference from the infeed drive but could also follow a speed reference from the control system C. If the control system C supplies the reference, that reference would be calculated from the parameters index length and cycle speed. In either case, the dancer 501 is supplying a trimming reference to the outfeed drive. Although the articulating motion of the dancer is as rapid as the cycle speed, the trim signal is naturally filtered by level of the trim which is 10%. The outfeed drive can be driven by a VFAC drive such as a SAFETRONICS PC3 with an analog input Part Number JVOP-115 which drives the final set of nip rolls 506, 508. The end result of the outfeed drive is to convert the starting and stopping of indexing the film to a continuous motion for rewinding.

The film is fed out of the outfeed station 500 at the same average speed as it is fed into the infeed station 58. This system is inexpensive compared to a complete speed matching drive control system.

A rewind stand 600 is provided having a roll 602 for rewinding film 28, and an alternate roll 604 mounted adjacent thereto for quick alternating change-overs when the roll 602, or alternately the roll 604, is full.

The rewind stand 600 also includes an upstream tension dancer 605. The dancer 605 includes a plurality of stationary rolls 606 and pivoting rolls 607 mounted on a pivoting tension control dancer arm 608. The rewind stand structure is a substantial structural mirror image of the unwind stand 24. The closed loop vector can be a Safetronics VG5. It allows full torque at 0 speed.

The rewind is different from the unwind in control logic only. While the unwind is trimming faster as the dancer arm 47 goes up, the rewind is driven faster as the tension control dancer arm 608 goes down. The dancer position is fed back to the controller as an analog level, 0–10 vcd. A slide potentiometer (not shown) is used to convert the dancer arm position to the analog signal. This actual dancer arm position is compared to the dancer arm position that is entered on the key pad of the controller. Standard PID control is applied to the desired dancer position versus the actual dancer arm position to turn a rewind motor (not shown) for the rolls 602, 604 at the proper speed.

The winder can be disabled by a switch, but otherwise, it is always enabled when the drives are armed (emergency stop is reset). This keeps the film at winding tension even when the machine is stopped.

The tension on the web is controlled by weight of the dancer arm 608 which is adjustable. The adjustment is made by increasing or decreasing the air pressure on the dancer arm 608. With the regulator at 0, there is maximum tension applied to the web. Increasing the pressure helps lift the dancer 608 arm so that the dancer arm 608 becomes lighter and hence there is less tension.

From the foregoing, it will be observed that numerous modifications and variations can be effectuated without departing from the true spirit and scope of the novel concept of the present invention. It is to be understood that no limitation with respect to the specific embodiment as illustrated is intended or should be inferred. The disclosure is intended to cover by the appended claims all such modifications as fall within the scope of the claims.

The invention claimed is:

1. An apparatus for applying zippers to a web, comprising:

a device for placing successive zipper onto the web, the device having zipper-holding-positions which hold individual zippers and successively present the zippers to the web;

a sensor arranged to sense a failure of a zipper to be properly positioned in a respective zipper-holding-position of said device; and wherein said sensor comprises a mechanical limit switch pressable to a zipper held within said zipper-holding-position.

2. The apparatus according to claim 1 comprising a controller and wherein said sensor is signal-connected to said controller to communicate a signal corresponding to said failure to said controller.

3. The apparatus according to claim 1 wherein said controller is connected to stop said apparatus upon receipt of said signal.

4. The apparatus according to claim 1 wherein said device comprises a rotatable zipper carrying apparatus.

5. The apparatus according to claim 1 comprising a controller and wherein said sensor is signal-connected to said controller to communicate a signal corresponding to said failure to said controller; wherein said controller is connected to stop said apparatus upon receipt of said signal; and wherein said device comprises a rotatable zipper carrying apparatus.

6. An apparatus for applying zippers to a web, comprising:

a device for placing successive zipper onto the web, the device having zipper-holding-positions which hold individual zippers and successively present the zippers to the web;

a sensor arranged to sense a failure of a zipper to be properly positioned in a respective zipper-holding-position of said device;

each of said zipper-holding-positions comprising a groove for receiving at least a portion of a zipper therein, wherein said sensor comprises a mechanical limit switch pressable to a zipper held within said zipper-holding-position.

7. An apparatus for applying zippers to a web, comprising:

a device for placing successive zipper onto the web, the device having zipper-holding-positions which hold individual zippers and successively present the zippers to the web;

a sensor arranged to sense a failure of a zipper to be properly positioned in a respective zipper-holding-position of said device;

each of said zipper-holding-positions comprising a groove for receiving at least a portion of a zipper therein, said apparatus comprising a controller, wherein said sensor is signal-connected to said controller to communicate a signal corresponding to said failure to said controller, wherein said sensor comprises an optical sensor, wherein said optical sensor comprises a mechanical limit switch pressable to a zipper held within said zipper-holding-position.

8. An apparatus for applying zippers to a web, comprising:

a device for placing successive zipper onto the web, the device having zipper-holding-positions which hold individual zippers and successively present the zippers to the web;

a sensor arranged to sense a failure of a zipper to be properly positioned in a respective zipper-holding-position of said device;

each of said zipper-holding-positions comprising a groove for receiving at least a portion of a zipper therein, when said sensor comprises an optical sensor, said optical sensor having an emitter emitting a light beam along the length of said groove, and a receiver arranged to receive said light beam, said light being interrupted by said failure.

* * * * *